(12) United States Patent
Kim et al.

(10) Patent No.: US 9,253,470 B2
(45) Date of Patent: Feb. 2, 2016

(54) 3D CAMERA

(75) Inventors: Il-do Kim, Seoul (KR); Byung-sun Choi, Suwon-si (KR); Young-hoon Jeong, Suwon-si (KR); Hyun-seok Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1167 days.

(21) Appl. No.: 13/241,599

(22) Filed: Sep. 23, 2011

(65) Prior Publication Data
US 2012/0113231 A1 May 10, 2012

(30) Foreign Application Priority Data

Nov. 5, 2010 (KR) .................. 10-2010-0109781

(51) Int. Cl.
*H04N 13/02* (2006.01)
(52) U.S. Cl.
CPC ....... *H04N 13/0239* (2013.01); *H04N 13/0271* (2013.01); *H04N 13/0285* (2013.01)
(58) Field of Classification Search
None
See application file for complete search history.

(56) References Cited

U.S. PATENT DOCUMENTS 7,369,315 B2 *   5/2008  Shen ............................. 359/629
8,077,964 B2 * 12/2011  Berestov et al. .............. 382/154
2002/0196423 A1 * 12/2002  Shima ......................... 356/3.14
2004/0165150 A1   8/2004  Jorke
2008/0051135 A1   2/2008  Destain et al.

FOREIGN PATENT DOCUMENTS

| JP | 10-20245 A | 1/1998 |
| JP | 2003-32703 A | 1/2003 |
| KR | 1020100095775 A | 9/2010 |
| WO | 2010016047 A1 | 2/2010 |

OTHER PUBLICATIONS

Communication dated Apr. 19, 2012 issued by the International Searching Authority in counterpart Korean Application No. PCT/2011/007863.

* cited by examiner

*Primary Examiner* — Geepy Pe
(74) *Attorney, Agent, or Firm* — Sughrue Mion, PLLC

(57) ABSTRACT

A 3D camera includes a first photographing lens unit; a first image sensor which obtains first image information of an object through the first photographing lens unit; a beam division unit disposed on an optical path between the first photographing lens unit and the first image sensor and which propagates light along a first path on which the first image sensor is positioned and along a second path that is different from the first path; a second photographing lens unit disposed on the second path; a second image sensor which obtains second image information of the object through the first photographing lens unit and the second photographing lens; and an image processing unit which generates 3D image information from the obtained first image information and the obtained second image information.

10 Claims, 5 Drawing Sheets

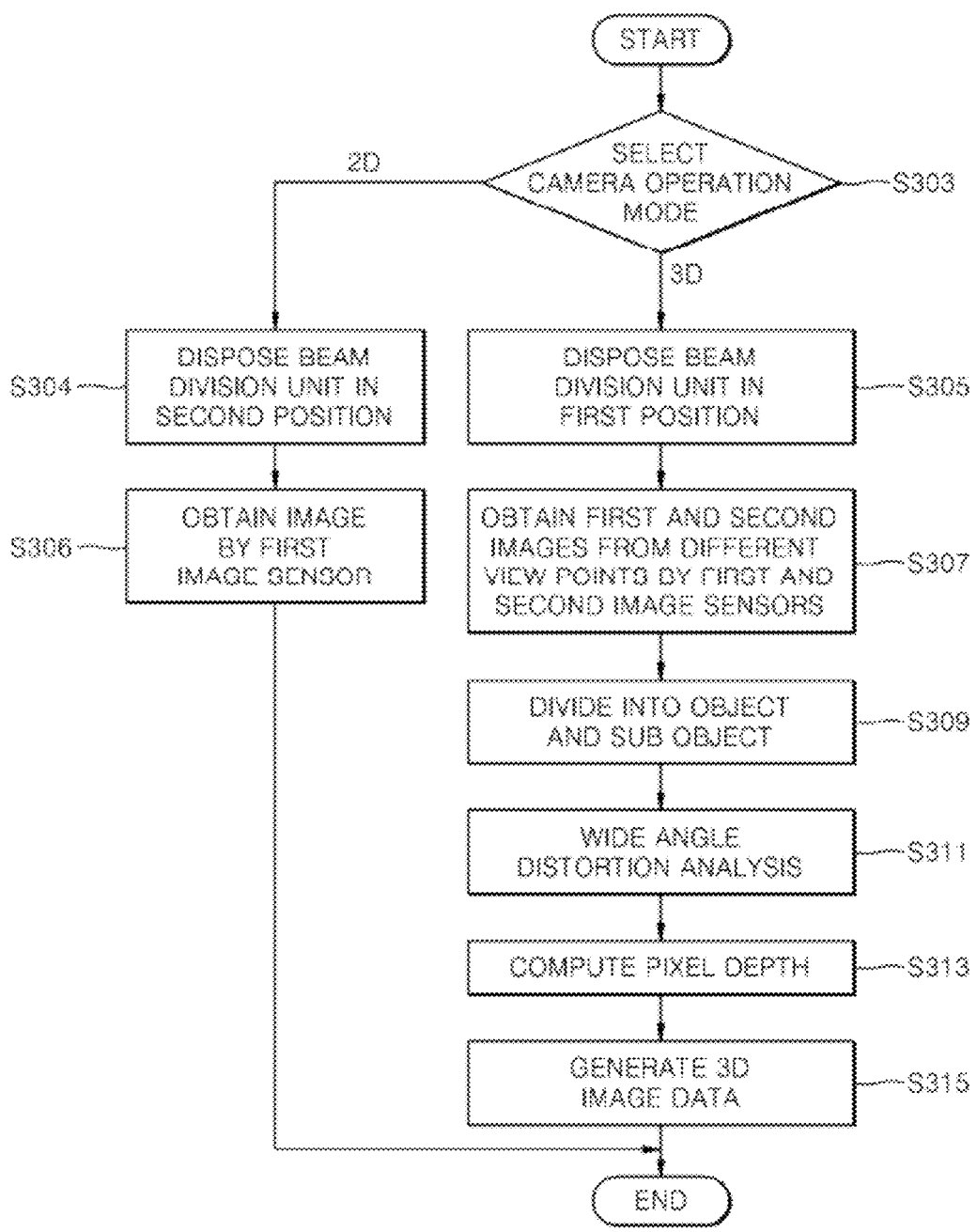

3D CAMERA

CROSS-REFERENCE TO RELATED PATENT APPLICATION

This application claims priority from Korean Patent Application No. 10-2010-0109781, filed on Nov. 5, 2010 in the Korean Intellectual Property Office, the disclosure of which is incorporated herein in its entirety by reference.

BACKGROUND

1. Field

Apparatuses and methods consistent with exemplary embodiments relate to a three-dimensional (3D) camera for obtaining 3D images.

2. Description of the Related Art

Recently, demand for various digital cameras is increasing, a 3D camera for capturing 3D images is getting attention.

Generally, a two-dimensional (2D) camera captures one scene by using one photographing lens and one image sensor. The obtained image is called a 2D image.

In order to capture a 3D image, like human eyes, at least two photographing lenses and two image sensors are needed. When a human views an object through their two eyes, the eyes have different optical axes. Accordingly, a 2D image viewed via the left eye and a 2D image viewed via the right eye show different geometrical locations, and due to the difference in geometrical locations, the sense of depth can be recognized.

Recent technical developments enable conversion of a 2D image into a 3D image. However, the conversion has a limitation. In response to such a limitation, various 3D cameras having at least two photographing lenses and one image sensor so as to capture an image from at least two view points are being developed.

SUMMARY

Aspects of one or more exemplary embodiments provide a three-dimensional (3D) camera that has a compact structure and is used to capture two- and three-dimensional images.

According to an aspect of an exemplary embodiment, there is provided a 3D camera including: a first photographing lens unit; a first image sensor which obtains first image information of an object through the first photographing lens unit; a beam division unit disposed on an optical path between the first photographing lens unit and the first image sensor and propagates light along a first path on which the first image sensor is positioned and along a second path that is different from the first path; a second photographing lens unit disposed on the second path; a second image sensor which obtains second image information of the object through the first photographing lens unit and the second photographing lens unit; and an image processing unit which generates 3D image information from the obtained first image information and the obtained second image information.

The beam division unit may include a half mirror which transmits a portion of incident light and reflects a remaining portion of the incident light.

The beam division unit may be arranged such that the first path is perpendicular to the second path.

One of a first optical system that includes the first photographing lens unit and a second optical system that includes the first photographing lens unit and the second photographing lens unit may have a viewing angle corresponding to a human sight, and the other optical system may have a viewing angle that is wider than the viewing angle described above.

The image processing unit may generate the 3D image information by computing depth per pixel according to a wide angle distortion analysis.

According to an aspect of another exemplary embodiment, there is provided a 2D/3D convertible camera including: a first photographing lens unit; a first image sensor which obtains first image information of an object through the first photographing lens unit; a beam division unit disposed between the first photographing lens unit and the first image sensor, wherein, in a 3D mode, the beam division unit is disposed on an optical path between the first photographing lens unit and the first image sensor and propagates light along a first path on which the first image sensor is positioned and along a second path that is different from the first path, and in a 2D mode, the beam division unit is removed from the optical path between the first photographing lens unit and the first image sensor; a second photographing lens unit disposed on the second path; a second image sensor which obtains second image information of the object through the first photographing lens unit and the second photographing lens unit; and an image processing unit which generates 3D image information by using the obtained first image information and the obtained second image information.

The beam division unit may include a half mirror which transmits a portion of incident light and reflects a remaining portion of the incident light.

The beam division unit may be driven to rotate with an axis of rotation located at a corner of the beam division unit.

In the 3D mode, rotary driving of the beam division unit may be controlled such that the first path is perpendicular to the second path.

According to an aspect of another exemplary embodiment, there is provided a method of operating a 3D camera including a first photographing lens unit, a first image sensor, a second photographing lens unit, a second image sensor, and a beam division unit so as to obtain an image from a plurality of view points, the method including: selecting a 2D mode or a 3D mode as a camera mode; according to the selection, controlling a position of the beam division unit such that in the 2D mode, image information is obtained by the first image sensor through the first photographing lens unit, and in the 3D mode, first image information is obtained by the first image sensor through the first photographing lens unit, and second image information is obtained by the second image sensor through the first photographing lens unit and the second photographing lens unit and; and generating 3D image information from the obtained first image information and the obtained second image information when the 3D mode is selected.

In the 2D mode, the beam division unit may be removed from an optical path between the first photographing lens unit and the first image sensor, and in the 3D mode, the beam division unit may be disposed on the optical path between the first photographing lens unit and the first image sensor to propagate light along a first path on which the first image sensor is positioned and a second path on which the second photographing lens unit is positioned.

According to an aspect of another exemplary embodiment, there is provided a method of operating a 3D camera including a first photographing lens unit, a first image sensor, a second photographing lens unit, a second image sensor, and a beam division unit so as to obtain an image from a plurality of view points, the method including: obtaining, at the first image sensor, first image information of an object through the first photographing lens unit; obtaining, at the second image sensor, second image information of the object through the first photographing lens unit and the second photographing lens unit; and generating 3D image information from the obtained first image information and the obtained second image information, wherein the beam division unit is disposed on an optical path between the first photographing lens unit and the first image sensor to propagate light along a first path on which the first image sensor is positioned and along a second path that is different from the first path and on which the second photographing lens is disposed.

BRIEF DESCRIPTION OF THE DRAWINGS

The above and other features and advantages will become more apparent by describing in detail exemplary embodiments with reference to the attached drawings in which:

FIG. 5 is a flowchart for explaining operations of a 3D camera according to an exemplary embodiment.

DETAILED DESCRIPTION OF EXEMPLARY EMBODIMENTS

Figure 1:
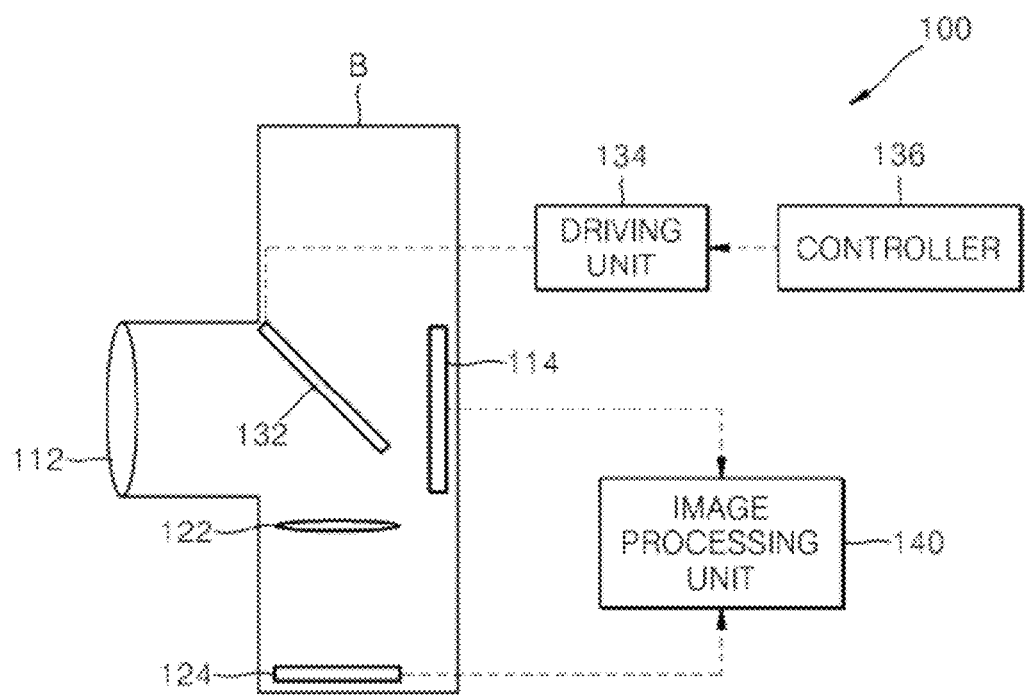
FIG. 1 is a schematic view of a three-dimensional (3D) camera according to an exemplary embodiment.

Hereinafter, exemplary embodiments will be described in detail with reference to the attached drawings. In the drawings, like reference numerals denote like elements, and sizes of the respective elements are exaggerated for clarity and ease of description.

FIG. 1 is a schematic view of a three-dimensional (3D) camera 100 according to an exemplary embodiment. The 3D camera 100 captures an image from at least two view points so as to generate 3D image information. Accordingly, the 3D camera 100 includes a first optical system that includes a first photographing lens unit 112 and a first image sensor 114 and a second optical system that includes the first photographing lens unit 112, a second photographing lens unit 122, and a second image sensor 124. In an exemplary embodiment, the first and second optical systems are compactly arranged in a camera main body B and, thus, the 3D camera 100 is similar to a two-dimensional (2D) camera in terms of appearance.

Referring to FIG. 1, the 3D camera 100 includes the first photographing lens unit 112, the first image sensor 114 for obtaining first image information of an object formed by the first photographing lens unit 112, a beam division unit 132 interposed between the first photographing lens unit 112 and the first image sensor 114, and the second image sensor 124 for obtaining second image information of the object formed by the first photographing lens unit 112 and the second photographing lens unit 122.

The beam division unit 132 may be arranged such that the position of the beam division unit 132 is capable of being changed by a driving unit 134. That is, the position of the beam division unit 132 may be changed by the driving unit 134 so that the beam division unit 132 is disposed on an optical path between the first photographing lens unit 112 and the first image sensor 114 or the beam division unit 132 is removed from the optical path. Such a driving is selectively performed to carry out an operation for obtaining a 3D image or a 2D image. For example, a controller 136 controls the driving unit 134 according to an input signal of a user. The beam division unit 132 may include, for example, a half mirror which allows a portion of incident light to transmit and a remaining portion of the incident light to be reflected. The beam division unit 132 may be driven by being rotated about an axis of rotation located at a corner of the beam division unit 132. The driving unit 134 may be any driving member, such as a motor or an actuator.

The first image sensor 114 and the second image sensor 124 obtain image information by converting an optical image into an electrical signal, and each may be any imaging device, such as a charge coupled device (CCD) or a complementary metal-oxide semiconductor (CMOS).

The first photographing lens unit 112 forms an image of an object on the first image sensor 114. Although the first photographing lens unit 112 illustrated in FIG. 1 includes one lens, it is understood that the structure of the first photographing lens unit 112 according to another exemplary embodiment is not limited thereto. For example, the first photographing lens unit 112 may include a plurality of lenses. The second photographing lens unit 122 forms an image of an object on the second image sensor 124, together with the first photographing lens unit 112. Like the first photographing lens unit 112, the second photographing lens unit 122 may include one or more lenses.

The first optical system that includes the first photographing lens unit 112 and the second optical system that includes the first photographing lens unit 112 and the second photographing lens unit 122 may have different focal distances. For example, one of the first optical system and the second optical system may have a viewing angle corresponding to human sight, that is, a focal distance of about 50 mm, and the other of the first optical system and the second optical system may have a viewing angle that is wider than the viewing angle described above. Due to this structure, the first image sensor 114 and the second image sensor 124 obtain different image information about the same object captured from different view points.

An image processing unit 140 analyzes and computes the different view point image information obtained by the first image sensor 114 and the second image sensor 124 so as to generate 3D image information.

Hereinafter, an operation process performed by the 3D camera 100 according to one or more exemplary embodiments will be described in detail with reference to FIGS. 2 through 4.

Figure 2:
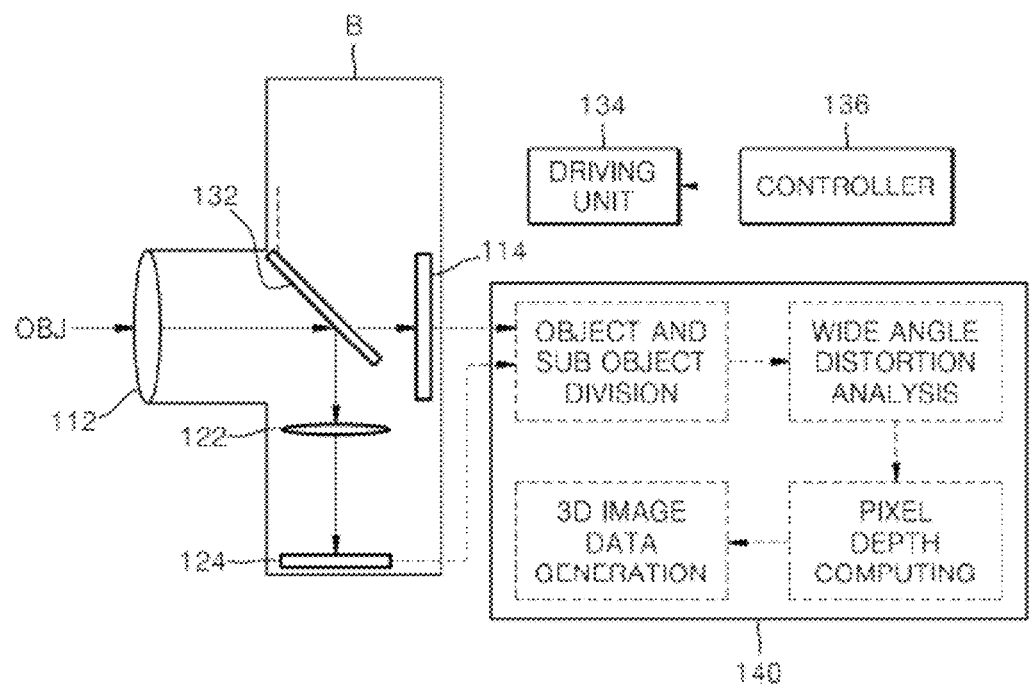
FIG. 2 is a view for explaining image processing performed using an optical path and an image processing unit when the 3D camera of FIG. 1 operates in a 3D mode according to an exemplary embodiment.
Figure 3A:
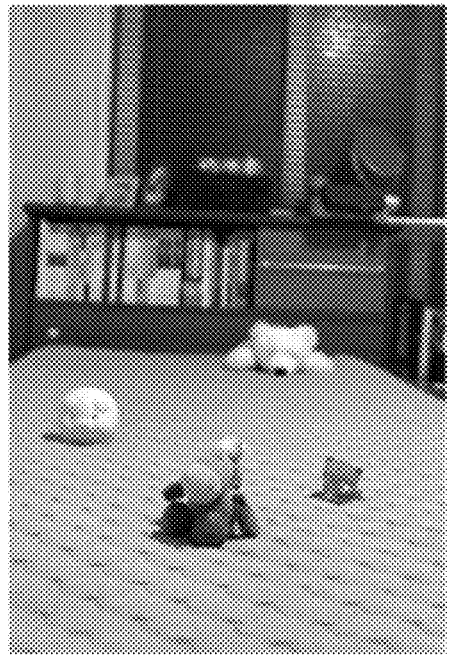
FIGS. 3A and 3B show example images captured from different view points according to an exemplary embodiment.
Figure 3B:

FIG. 2 is a view for explaining image processing performed using an optical path and the image processing unit 140 when the 3D camera 100 of FIG. 1 operates in a 3D mode. FIGS. 3A and 3B show example images captured from different view points.

In the 3D mode, the position of the beam division unit 132 is changed by the driving unit 134 according to a control signal transmitted by the controller 136 in such a way that the beam division unit 132 is disposed on the optical path between the first photographing lens unit 112 and the first image sensor 114. In this arrangement, light from an object (OBJ) passes the first photographing lens unit 112 and then is divided into two paths as illustrated in FIG. 2: a first path on which the first image sensor 114 is positioned and a second path on which the second image sensor 124 is positioned. The beam division unit 132 may be arranged such that the first and second paths may be perpendicular to each other. In this case, the components of the 3D camera 100 may be easily and compactly arranged in the camera main body B.

The first image sensor 122 obtains a first image of the OBJ formed by the first photographing lens unit 112, and the second image sensor 124 obtains a second image of the OBJ formed by the first photographing lens unit 112 and the second photographing lens unit 122. The first image and the second image are captured from different view points. For example, as illustrated in FIGS. 3A and 3B, the first and second images have different size ratios corresponding to different distances. The image shown in FIG. 3A corresponds to a focal distance of 24 mm and the image shown in FIG. 3B corresponds to a focal distance of 50 mm. An object in the image of FIG. 3A, which has a relatively wide viewing angle, looks smaller than the same object in the same position in the image of FIG. 3B, which has a relatively small viewing angle. This is because the sense of depth with respect to the same position differs according to viewing angle. In general, the sense of depth when perceived differently compared to human sight is referred to as a wide angle distortion, and according to an exemplary embodiment, a depth for generation of 3D image information is computed by analyzing the wide angle distortion.

The image processing unit 140 generates 3D image information by analyzing images obtained by the first image sensor 114 and the second image sensor 124. For example, objects shown in the first and second images are divided into objects and sub objects. Then, according to a wide angle distortion analysis, the divided units in the first and second images are matched to compute size ratios. From the computing results, depth per pixel is measured, and from the depth results, 3D image information, for example, left-eye image information and right-eye image information, are generated.

Figure 4:
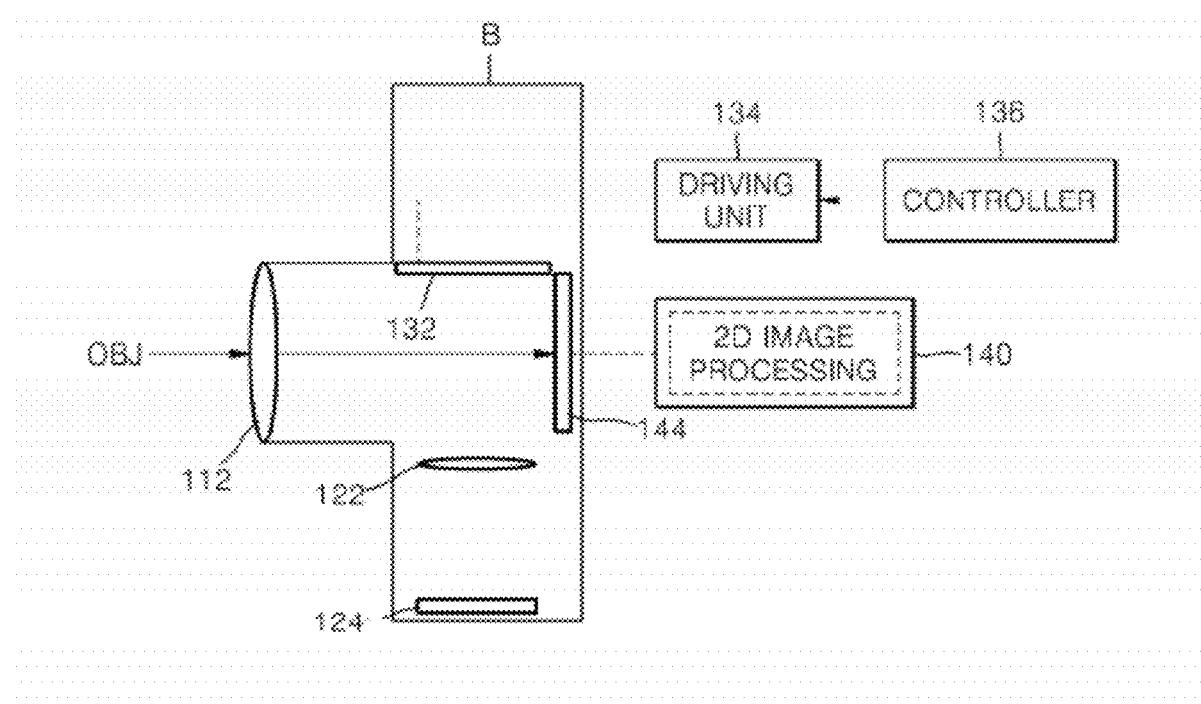
FIG. 4 is a view for explaining an optical path when the 3D camera of FIG. 1 operates in a two-dimensional mode according to an exemplary embodiment.

FIG. 4 is a view for explaining an optical path when the 3D camera of FIG. 1 operates in a 2D mode according to an exemplary embodiment. In the 2D mode, the beam division unit 132 is controlled to not be disposed on the optical path between the first photographing lens unit 112 and the first image sensor 114. Accordingly, light from the OBJ passes the first photographing lens unit 112 and an image of the OBJ is formed on the first image sensor 114, and the light from the OBJ does not propagate toward the second image sensor 124. The image processing unit 140 processes the image information obtained by the first image sensor 112 to generate a 2D image. However, it is understood that another exemplary embodiment is not limited to the above-described structure. For example, according to another exemplary embodiment, the beam division unit 132 may be disposed in a same position for both the 2D mode and the 3D mode.

FIG. 5 is a flowchart for explaining operations of a 3D camera according to an exemplary embodiment. The flowchart is for operating method of 3D camera including a first photographing lens unit, a first image sensor, a second photographing lens unit, a second image sensor, and a beam division unit, to obtain an image of a plurality of view points. The structure of FIG. 1 is an example structure that may embody the method.

A user selects a 2D mode or a 3D mode (operation S303), and when the 3D mode is selected, the beam division unit is controlled to be in a first position (operation S305). The first position refers to an optical arrangement in which a first image of an object is formed on the first image sensor and a second image of the object is formed on the second image sensor. That is, the beam division unit is disposed such that light from an object is divided to propagate toward the first and second image sensors. For example, the beam division unit may be disposed on an optical path between the first photographing lens unit and the first image sensor.

Thus, the first image sensor and the second image sensor respectively obtain the first and second images captured from different view points (operation S307).

The image processing unit analyzes the images obtained by the first image sensor and the second image sensor to generate 3D image information. For example, components of the images are divided into objects and sub objects (operation S309), and a wide angle distortion analysis is performed by matching the divided units and comparing size ratios (operation S311). From the analysis results, depth per pixel is computed and 3D image information is generated.

When the 2D mode is selected, the beam division unit is controlled to be in the second position (operation S304). The second position refers to an optical arrangement in which an image of an object is formed only on the first image sensor. For example, the beam division unit is removed from the optical path between the first photographing lens unit and the first image sensor so as not to allow light from the object to propagate toward the second image sensor. Accordingly, the first image sensor obtains an image (operation S306), and the obtained image is a 2D image.

The 3D camera described above includes two photographing lens units and two image sensors and has a compact optical system. The appearance of the 3D camera is similar to that of a 2D camera, and the 3D camera may be used to obtain 2D and 3D images.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A three-dimensional (3D) camera comprising:
   a first photographing lens unit;
   a first image sensor which obtains first image information of an object through the first photographing lens unit;
   a beam division unit disposed on an optical path between the first photographing lens unit and the first image sensor to propagate light along a first path on which the first image sensor is positioned and along a second path that is different from the first path;
   a second photographing lens unit disposed on the second path;
   a second image sensor which obtains second image information of the object through the first photographing lens unit and the second photographing lens unit; and
   an image processing unit which generates 3D image information from the obtained first image information and the obtained second image information,
   wherein one of a first optical system comprising the first photographing lens unit, through which the first image information is obtained, and a second optical system comprising the first photographing lens unit and the second photographing lens unit, through which the second image information is obtained, has a viewing angle corresponding to a human sight, and the other of the first optical system and the second optical system has a viewing angle that is wider than the viewing angle corresponding to the human sight, and
   wherein the image processing unit generates the 3D image information by computing depth per pixel according to a wide angle distortion analysis.

2. The 3D camera of claim 1, wherein the beam division unit comprises a half minor which transmits a portion of incident light and reflects a remaining portion of the incident light.

3. The 3D camera of claim 1, wherein the first path is perpendicular to the second path.

4. The 3D camera of claim 1, wherein the image processing unit divides components of the first image information and the second image information into objects and sub objects, and performs the wide angle distortion analysis by matching the divided objects and sub objects and comparing size ratios.

5. The 3D camera of claim 1,:
wherein,
in a 3D mode of operation, the beam division unit is disposed on the optical path between the first photographing lens unit and the first image sensor, and
in a 2D mode of operation, the beam division unit is not on the optical path between the first photographing lens unit and the first image sensor.

6. The 3D camera of claim 5, wherein the beam division unit comprises a half mirror which transmits a portion of incident light and reflects a remaining portion of the incident light.

7. The 3D camera of claim 5, further comprising a driving unit which drives the beam division unit to rotate with an axis of rotation at a corner of the beam division unit.

8. The 3D camera of claim 5, further comprising a driving unit which, in the 3D mode, rotary drives the beam division unit such that the first path is perpendicular to the second path.

9. A method of operating a 3D camera comprising a first photographing lens unit, a first image sensor, a second photographing lens unit, a second image sensor, and a beam division unit so as to obtain an image from a plurality of view points, the method comprising:

obtaining, at the first image sensor, first image information of an object through the first photographing lens unit;

obtaining, at the second image sensor, second image information of the object through the first photographing lens unit and the second photographing lens unit; and generating 3D image information from the obtained first image information and the obtained second image information, wherein the beam division unit is disposed on an optical path between the first photographing lens unit and the first image sensor to propagate light along a first path on which the first image sensor is positioned and along a second path that is different from the first path and on which the second photographing lens is disposed, wherein one of a first optical system comprising the first photographing lens unit, through which the first image information is obtained, and a second optical system comprising the first photographing lens unit and the second photographing lens unit, through which the second image information is obtained, has a viewing angle corresponding to a human sight, and the other of the first optical system and the second optical system has a viewing angle that is wider than the viewing angle corresponding to the human sight, and wherein the image processing unit generates the 3D image information by computing depth per pixel according to a wide angle distortion analysis.

10. A non-transitory computer-readable recording medium having recorded thereon a program executable by a computer for performing the method of claim 9.

* * * * *